(12) United States Patent
Hamilton et al.

(10) Patent No.: US 7,177,127 B2
(45) Date of Patent: Feb. 13, 2007

(54) METHODS AND SYSTEMS FOR ELECTROSTATIC DISCHARGE

(75) Inventors: Gordon L. Hamilton, North Attleboro, MA (US); Donald McKinlay, Wareham, MA (US)

(73) Assignee: Invensys Systems, Inc., Foxboro, MA (US)

( * ) Notice: Subject to any disclaimer, the term of this patent is extended or adjusted under 35 U.S.C. 154(b) by 96 days.

(21) Appl. No.: 10/972,805

(22) Filed: Oct. 25, 2004

(65) Prior Publication Data

US 2005/0122657 A1    Jun. 9, 2005

Related U.S. Application Data

(60) Provisional application No. 60/514,275, filed on Oct. 24, 2003.

(51) Int. Cl.
*H02H 9/00* (2006.01)

(52) U.S. Cl. ........................................................ 361/56

(58) Field of Classification Search ................... 361/56
See application file for complete search history.

(56) References Cited

U.S. PATENT DOCUMENTS

| 4,158,863 | A  | * | 6/1979  | Naylor ......................... 361/56 |
| 5,563,757 | A  | * | 10/1996 | Corsi ........................... 361/56 |
| 6,396,712 | B1 | * | 5/2002  | Kuijk ........................... 361/767 |
| 6,580,591 | B2 | * | 6/2003  | Landy ........................... 361/56 |
| 6,704,180 | B2 | * | 3/2004  | Tyler et al. .................... 361/56 |
| 6,750,953 | B1 | * | 6/2004  | Douglas ..................... 356/4.08 |

* cited by examiner

*Primary Examiner*—Ronald W. Leja
(74) *Attorney, Agent, or Firm*—Foley Hoag, LLP

(57) ABSTRACT

An indirect clamping topology may be used to protect against the damaging effects of an electrostatic discharge event. An input node of a device is protected by a guard. The guard is driven by a signal from a unity-gain amplifier that flows through a resistance. The input node is clamped to the guard by a diode, and the guard is clamped to a low-impedance rail by another diode. The resistance of the low-impedance rail is less than that of the resistance through which the signal from the unity-gain amplifier flows, so that voltage resulting from the event flows to the low-impedance rail and not to the amplifier.

10 Claims, 2 Drawing Sheets

METHODS AND SYSTEMS FOR ELECTROSTATIC DISCHARGE

CROSS-REFERENCE TO RELATED APPLICATION

The present application claims the benefit of U.S. Provisional Patent Application Ser. No. 60/514,275, which was filed on Oct. 24, 2003, by Gordon L. Hamilton and Don McKinlay for "Methods and Systems for Electrostatic Discharge" and is hereby incorporated by reference.

BACKGROUND OF THE INVENTION

1. Field of the Invention

The disclosed methods and systems relate generally to electrostatic discharge protection, and more particularly to protecting a sensor input from electrostatic discharge.

2. Background Information

By design, or often as a secondary effect of semiconductor manufacturing technology, inputs of integrated circuits ("ICs") may become highly conductive in the manner of a diode if the voltage on the input is below the most negative potential on the IC or above the most positive potential. This potential problem may be avoided by specifying that inputs must not be more than 0.3 volt ("V") above the positive potential or more than 0.3 V below the negative potential. In most cases, no harm is done and, by specification it is often allowable to exceed these limits if the resulting current is limited to 10 milliamperes ("ma") or less. Latch-up or damaging effects typically are likely in the 100 ma vicinity, although these levels are usually not published. The allowable current levels for amplifiers with very low bias currents may be less than these levels, but these allowable current levels have likely increased as technology improves. However, the ability of ICs to accept surge currents is typically very limited. Clamping the input signals with diodes to the supply voltages and inserting some resistance between the diode clamps and the device input may provide protection, but there are three critical issues: (i) the magnitude of the potentially damaging transient; (ii) the capability of the diode to carry this transient; and, (iii) the leakage of the diode and its impact on the circuit under normal operating conditions.

Some equipment for electrostatic discharge ("ESD") provides impedances of 1500 ohms or 330 ohms. Accordingly, amperes of current will flow, though briefly, in these discharges. High conductivity diodes are available that may readily accept these discharge currents. However, even if described as "low leakage," these leakages are likely to be orders of magnitude worse than the bias currents of ICs with low input currents, e.g., nanoamperes versus femtoamperes, or worse.

SUMMARY OF THE INVENTION

In an embodiment of the invention, there is provided a method of protecting a device with an input node from an electric surge using an indirect clamping topology. The method includes providing a guard for the input node. A unity gain amplifier is employed to amplify a signal from the input node, wherein the amplified signal drives the guard through a resistance. The resistance is higher than that of a low-impedance rail. The guard is clamped to the low-impedance rail through at least one diode. The input node is clamped to the guard through at least one diode. In a related embodiment, the device may be an instrument, such as a pH sensor.

In another related embodiment, the input node may be clamped to the guard through a pair of diodes connected in an anti-parallel configuration. In still another related embodiment, the low-impedance rail may include at least one zener diode connected to ground. In yet another related embodiment, the input node may be a high-impedance input node of the device.

In another embodiment of the invention, there is provided an indirect clamping topology to protect a device from an electric surge, wherein the device has at least one input node. The indirect clamping topology includes a guard, a low-impedance rail, a unity gain amplifier, and at least two diodes. The guard is connected to the input node. The unity gain amplifier receives a signal from the input node, and drives the guard through a resistance. The resistance is higher than that of the low-impedance rail. At least one diode clamps the guard to the low-impedance rail, and the other diode clamps the input node to the guard. In a related embodiment, the device may be an instrument, such as a pH sensor.

In another related embodiment, the topology may include at least three diodes. Two of the diodes may be arranged in an anti-parallel configuration, and may be used to clamp the input node to the guard. In yet another related embodiment, the low-impedance rail may include at least one zener diode connected to ground. In still another related embodiment, the input node of the device may be a high-impedance node.

BRIEF DESCRIPTION OF THE DRAWINGS

The invention description below refers to the accompanying drawings, of which.

DETAILED DESCRIPTION OF AN ILLUSTRATIVE EMBODIMENT

To provide an overall understanding, certain illustrative embodiments will now be described; however, it will be understood by one of ordinary skill in the art that the systems and methods described herein may be adapted and modified to provide systems and methods for other suitable applications and that other additions and modifications may be made without departing from the scope of the systems and methods described herein.

Unless otherwise specified, the illustrated embodiments may be understood as providing exemplary features of varying detail of certain embodiments, and therefore, unless otherwise specified, features, components, modules, and/or aspects of the illustrations may be otherwise combined, separated, interchanged, and/or rearranged without departing from the disclosed systems or methods. Additionally, the shapes and sizes of components are also exemplary and unless otherwise specified, may be altered without affecting the scope of the disclosed and exemplary systems or methods of the present disclosure.

Figure 1:
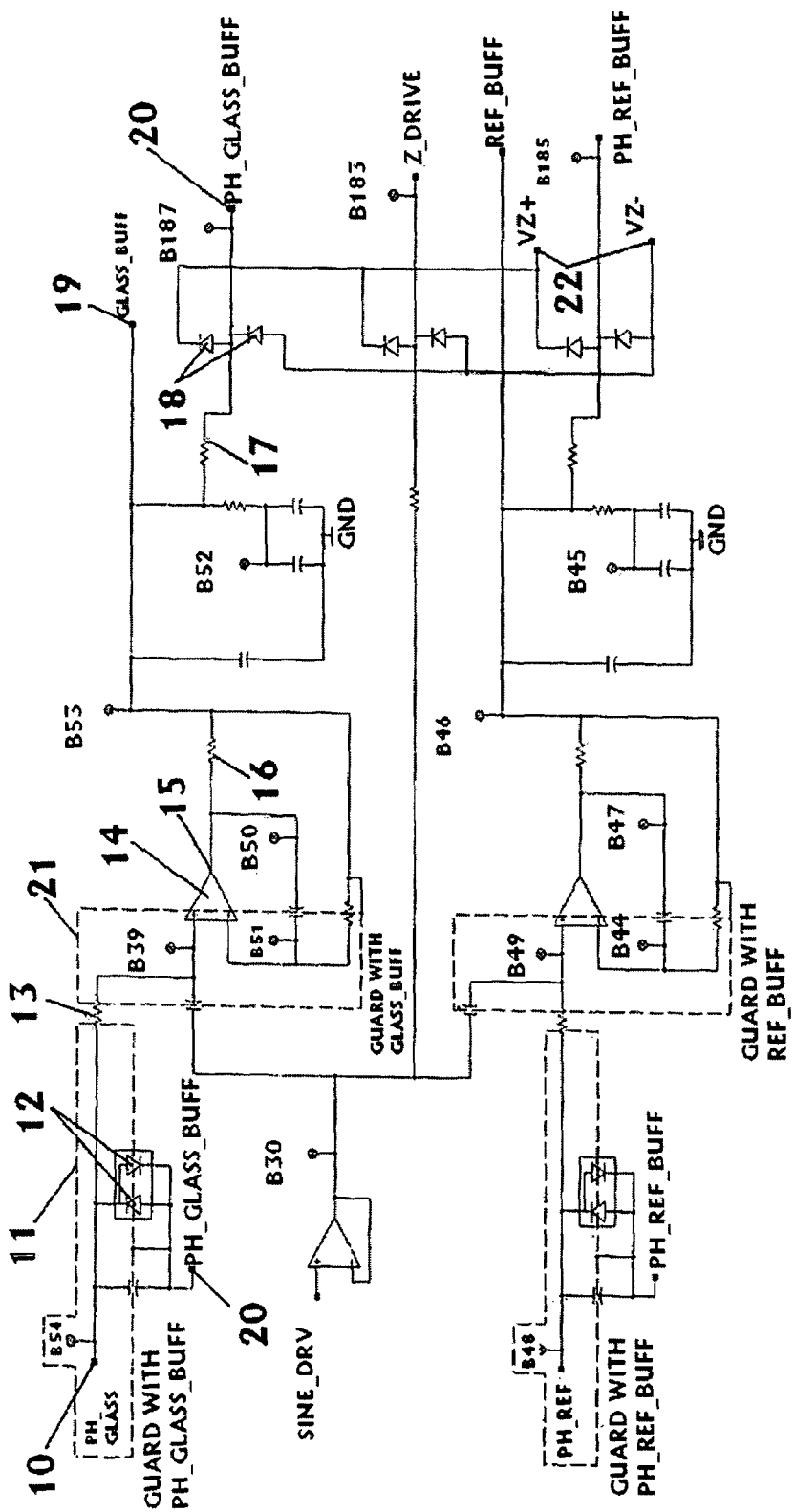
FIG. 1 shows an indirect clamping topology at an input node, which also includes a standard clamping topology.

FIG. 1 shows an illustrative embodiment of an indirect clamping topology. Such a topology may be employed to protect circuitry from the damaging effects of an electrostatic discharge (ESD) event or other event involving an electric surge. In one embodiment, the indirect clamping topology may be applied to the inputs of an instrument, such as a pH analyzer or sensor, as shown in the configuration of FIG. 1. Of course, other uses may be evident to those of ordinary skill in the art, such as applying the technology to inputs of other sensors, including temperature sensors.

In a pH sensor illustrative embodiment as in FIG. 1, an input node 10 receives the output of a high impedance pH sensor probe. The input node 10 may be maintained by a buffer or a guard, such as a first circuit trace 11. The first circuit trace 11 may include signals that are at the substantially the same potential as the signal at the input node 10. The first circuit trace 11 follows a generally closed path to enclose the input node 10. To serve as a guard, the first circuit trace 11 is driven by a signal, which is produced by an element or elements that result in the input to the element or elements being the same as the output from the element or elements, which may include but is not limited to a unity-gain amplifier 14. The unity-gain amplifier 14 produces this signal at an output 15, which is then buffered through a resistance, shown by a buffering resistor 17. The buffered signal travels through node ph_glass_buff 20 to the first circuit trace 11, where it drives the first circuit trace 11. Accordingly, if a leakage path exists between the circuit trace 11 and the input node 10, the leakage current will have reduced impact as there will be no voltage at the input node 10 and thus no leakage current effect. In one embodiment, an objective can be to produce an impedance at the input node 10 substantially equal to and/or on the order of $10^{13}$ ohms.

The signal from the output 15 of the unity-gain amplifier 14 is also used to drive other circuit traces to serve as guards, such as a second circuit trace 21 that serves as a guard for the inputs of the unity-gain amplifier 14. The signal from the output 15 travels through node glass_buff 19 to the second circuit trace 21.

It is possible to protect the output 15 of the unity-gain amplifier 14 by clamping the signal from the output 15 that is used to drive the first circuit trace 11 and the second circuit trace 21 where that signal is exposed. This clamp is necessary because just placing resistance between the output 15 and the guards (i.e., the driven first circuit trace 11 and second circuit trace 21) may have a reduced funtional impact. In other words, while the resistance of a leakage path to the input node 10 may be high, such that the conductivity of that leakage path to the input node 10 may be considered to be low, it is not low enough to ignore. Thus, at least one protection diode 18 protects the second driven circuit trace 21 against the damaging effects of an ESD event or other electric surge event by clamping the second circuit trace 21 to a low-impedance rail 23, shown in FIG. 2. In a preferred embodiment, at least two protection diodes 18 are used. The protection diodes 18 collect signal from the node glass_buff 19 through the buffering resistor 17, and send it to the low-impedance rail 23 through nodes VZ+22 and VZ−22. Though the unity-gain amplifier 14 drives the second circuit trace 21, as described above, that signal first passes through a resistance, shown as an isolating resistor 16. The impedance of the isolating resistor 16 is much greater than the impedance of the path from the node glass_buff 19 through the buffering resistor 17 and the protection diodes 18 to the low-impedance rail 23. Thus, any voltage produced by an ESD event or other event involving electric surge at the circuit trace 21 will travel through the node glass_buff 19 and the resistor 17 and the diodes 18 to the low-impedance rail 23, and not to the output 15 of the unity-gain amplifier 14. Thus, the resistor 16 isolates the output 15 of the unity-gain amplifier 14 from any damaging effects produced by an ESD event or other electric surge event.

Similarly, the protection diodes 18 may also protect the first circuit trace 11 from any damaging effects of an ESD event or other electric surge event at that guard. In such an event, the protection diodes 18 clamp the first circuit trace 11, similar to the clamping provided to the second circuit trace 21, as described above. As in that case, the output 15 of the unity-gain amplifier 14, which drives the first circuit trace 11 through the node ph_glass_buff 20, is also protected. Thus, the impedance of the path from the first circuit trace 11 through the node ph_glass_buff 20 to the protection diodes 18 and on to the low-impedance rail 23 is less than the impedance of the path from the first circuit trace 11 through the node ph_glass_buff and through the buffering resistor 17 and the isolation resistor 16 to the output 15. As a result, any voltage produced by an ESD event or other event involving electric surge at the first circuit trace 11 will travel to the low-impedance rail 23 and not to the unity-gain amplifier 14.

Here, the protection diodes 18 may leak, but instead of affecting the input node 10 by allowing current flow into the high impedance input line, the protection diodes 18 are supplied by the signal from the output 15 that flows through the isolating resistor 16 and the buffering resistor 17, which prevent the surge from being driven back into the output 15. Because the diode leakage is comparatively low (e.g., nano-amperes), the offset voltage produced on the guard potential is the product of this leakage and the series resistance, or in this example, microvolts. This offset voltage can be considered negligible compared to other potentials on the printed wire assembly (PWA) and effects such as offset voltage in the amplifier then may affect the value of the guard potential.

The approach described above to protect the guards cannot be applied directly to a high impedance input itself, such as may be found at the input node 10. At such an input, the same leakage effect as describe above is multiplied by the impedance at the input of the unity-gain amplifier 14, which may produce unacceptable errors. However, the protection diodes 18 will have minimal current flow through them if there is virtually no voltage across them. In such high-impedance applications, the conduction "knee" of a diode is not the 0.6 to 0.7 volt threshold typically associated with conduction of diodes; the conduction that occurs at much lower voltages remains significant in that context. However, with less than around 100 mv across the diodes, the conduction there-through may be comparatively low, and may approach an undetectable amount.

To protect the input node 10 itself, at least one diode 12 is used to clamp the input node 10 to the driven first circuit trace 11 serving as a guard. In a preferred embodiment, at least two diodes 12 are used. The diodes 12 are in an anti-parallel configuration. In other words, the diodes 12 are placed in parallel such that the negative terminal of each diode 12 is connected to the positive terminal of the other diode 12. Further, a resistance, shown as a resistor 13, may be placed between the input node 10 and the input of the unity-gain amplifier 14 to protect those inputs from the damaging effects of an ESD event at the input node 10. Thus, the resistor 13 may protect the input of the amplifier 14 from as the isolating resistor 16 protects the output 15 of the unity-gain amplifier 14. In other words, the impedance of the path from the input node 10 through the diodes 12 to the driven first circuit trace 11 (and on to the low-impedance rail 23 as described above) is less than the impedance of the resistor 13, such that voltage from an ESD event at the input node 10 will flow to the low-impedance rail 23 and not to the input of the unity-gain amplifier 14.

Figure 2:
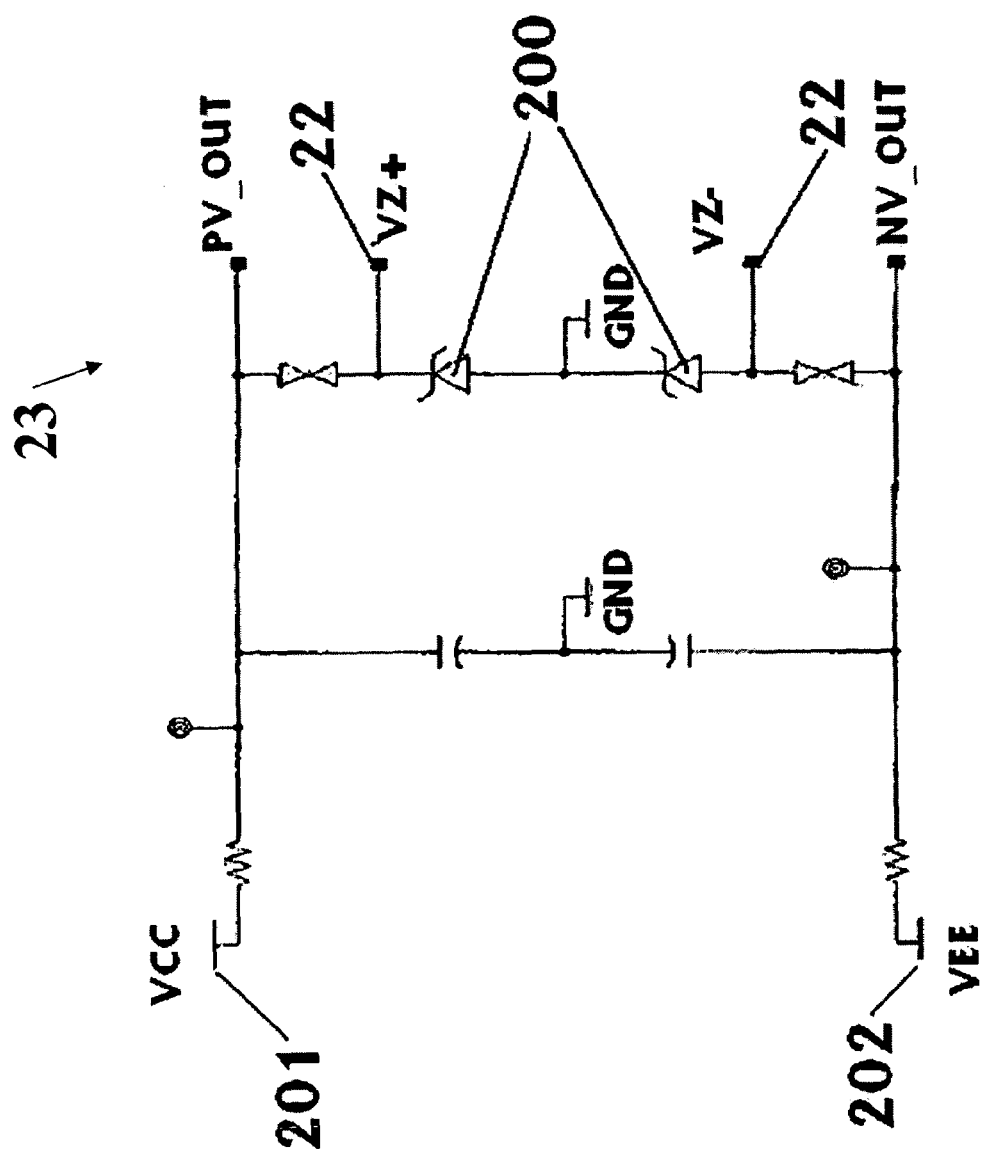
FIG. 2 shows a low-impedance rail that receives an electric surge from the input node via the indirect clamping topology.

FIG. 2 shows a configuration of a low-impedance rail 23 that results in no additional paths to energy sources being created by this ESD protection. This configuration employs at least one zener diode 200, though of course more may be used, such as the two shown in FIG. 2. A non-critical source is used to supply potential at inputs 201 and 202. The zener diode 200 in placed in parallel across this potential; of course, if multiple zener diodes 200 are used, as shown in FIG. 2, these are first placed in series and then the series combination is placed in parallel across the potential. The zener diodes 200 are then connected to ground. If an ESD event or other electric surge event occurs, the resulting voltages will travel to the nodes VZ+22 and VZ−22 as described above and shown in both FIG. 1 and FIG. 2, and then through the zener diodes 200 to ground. The zener leakage is higher than the reverse leakage of the clamping diodes in FIG. 1, so applying a potential on the zener diodes 200 from a non-critical source insures that clamping diodes to critical signals remain reverse biased.

The resistors described herein, which may limit and/or reduce the current driven into or pulled out of the sensitive integrated circuits, may already be present to limit the flow of energy into the sensor's environment that may, at least occasionally, be an explosive atmosphere.

What is claimed is:

1. A method of protecting a device from an electric surge using an indirect clamping topology, wherein the device includes an input node, the method comprising:
   providing a first guard for the input node;
   providing a second guard for inputs to a unity gain amplifier;
   employing the unity gain amplifier to amplify a signal from the input node, wherein the amplified signal drives the first and second guards through a resistance, and wherein the resistance is higher than that of a low-impedance rail;
   clamping the first and second guards to the low-impedance rail through at least one diode; and
   clamping the input node to the first guard through at least one diode.

2. The method according to claim 1, wherein clamping the input node comprises clamping the input node to the first guard through a pair of diodes connected in an anti-parallel configuration.

3. The method according to claim 1, wherein the low-impedance rail comprises at least one zener diode connected to ground.

4. The method according to claim 1, wherein the input node is a high-impedance input node of the device.

5. The method according to claim 1, wherein the device is an instrument.

6. An indirect clamping topology to protect a device from an electric surge, wherein the device has at least one input node, the indirect clamping topology comprising:
   a first guard connected to the input node;
   a low-impedance rail;
   a unity gain amplifier that receives a signal from the input node;
   a second guard connected to inputs of the unity gain amplifier, the unity gain amplifier driving the first and second guards through a resistance, where the resistance is higher than that of the low-impedance rail;
   at least one diode that clamps the first and second guards to the low-impedance rail; and
   at least one diode that clamps the input node to the first guard.

7. The indirect clamping topology according to claim 6, wherein a pair of diodes connected in anti-parallel clamps the input node to the first guard.

8. The indirect clamping topology according to claim 6, wherein the low-impedance rail comprises at least one zener diode connected to ground.

9. The indirect clamping topology according to claim 6, wherein the input node of the device is a high-impedance input node.

10. The indirect clamping topology according to claim 9, wherein the device is an instrument.

* * * * *